US012284493B2

(12) United States Patent
Li et al.

(10) Patent No.: US 12,284,493 B2
(45) Date of Patent: Apr. 22, 2025

(54) VIBRATIONAL TRANSDUCER CONTROL

(71) Applicant: Cirrus Logic International Semiconductor Ltd., Edinburgh (GB)

(72) Inventors: Ning Li, Cedar Park, TX (US); Hamid Sepehr, London (GB); Ben Leslie, London (GB); Aleksey Khenkin, Lago Vista, TX (US); Michael Kurek, Austin, TX (US); Marco A. Janko, Austin, TX (US); Vadim Konradi, Austin, TX (US); Peter Foskey, Austin, TX (US); Aaron Treptow, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 169 days.

(21) Appl. No.: 18/073,853

(22) Filed: Dec. 2, 2022

(65) Prior Publication Data

US 2024/0114288 A1 Apr. 4, 2024

Related U.S. Application Data

(60) Provisional application No. 63/411,706, filed on Sep. 30, 2022.

(51) Int. Cl.

| | |
|---|---|
| ***H04R 3/00*** | (2006.01) |
| ***H04R 9/02*** | (2006.01) |
| ***H04R 29/00*** | (2006.01) |

(52) U.S. Cl.

CPC ............ *H04R 3/007* (2013.01); *H04R 9/022* (2013.01); *H04R 29/001* (2013.01); *H04R 2400/03* (2013.01)

(58) Field of Classification Search

CPC ...... H04R 3/007; H04R 9/022; H04R 29/001; H04R 2400/03

USPC ................ 381/55, 59, 58, 96, 150, 162, 164

See application file for complete search history.

(56) References Cited

U.S. PATENT DOCUMENTS

| | | | |
|---|---|---|---|
| 10,567,895 B2 | 2/2020 | Lawrence et al. | |
| 10,582,300 B2 | 3/2020 | Bjork et al. | |
| 10,616,683 B2 | 4/2020 | Lawrence et al. | |
| 10,732,714 B2 | 8/2020 | Rao et al. | |
| 11,374,522 B2 | 6/2022 | Hernandez et al. | |
| 2018/0132049 A1* | 5/2018 | Risberg | H04R 3/007 |
| 2020/0272239 A1 | 8/2020 | Rao et al. | |

FOREIGN PATENT DOCUMENTS

CN 108419186 A 8/2018

OTHER PUBLICATIONS

International Search Report and Written Opinion of the International Searching Authority, International Application No. PCT/GB2023/052372, mailed Nov. 29, 2023.

* cited by examiner

*Primary Examiner* — Vivian C Chin
*Assistant Examiner* — Con P Tran
(74) *Attorney, Agent, or Firm* — Jackson Walker L.L.P.

(57) ABSTRACT

A method of controlling a vibrational transducer, the method comprising: tracking a temperature metric of the vibrational transducer; and controlling a drive signal for the vibrational transducer, where the drive signal is limited to a value to protect the vibrational transducer from over excursion, and where said value is a function of the tracked temperature metric.

16 Claims, 10 Drawing Sheets

VIBRATIONAL TRANSDUCER CONTROL

FIELD OF DISCLOSURE

The present disclosure relates in general to vibrational transducer control, for example to controlling a drive signal for driving a vibrational transducer. In particular, the present disclosure relates to over-excursion protection in relation to vibrational transducers.

BACKGROUND

Vibrational transducers find use in a range of technical fields, including in the field of haptics feedback. As is well known, haptics (or haptic) technology creates an experience of touch, or a tactile experience, by applying forces, vibrations, or motions to a user.

Haptics effects may be used to enhance a user experience in areas such as gaming or mobile phone ringtones, by applying a driving waveform to a vibrational transducer (haptics transducer) such as an LRA (Linear Resonant Actuator) or a piezoelectric transducer. Using the vibrational transducer, forces may be applied to the user to give a haptic experience (also referred to as haptic feedback) which accompanies and/or enhances another user experience, such as an audio or visual experience, or which merely provides a user with tactile information concerning the status of an ongoing process.

Haptics effects may be provided by a host device, which may also provide an accompanying experience such as an audio or audio-visual experience as mentioned above. A host device may be considered a haptics-enabled device (a device enabled with haptics technology) where it is provided with an LRA or other haptics output transducer which is driven to apply forces directly or indirectly (e.g. via a touchscreen) to a user. In this context, a host device may be considered an electrical or electronic device and may be a mobile device. Example devices include a portable and/or battery powered host device such as a mobile telephone or smartphone, an audio player, a video player, a PDA, a mobile computing platform such as a laptop computer or tablet and/or a games device.

Existing control of vibrational transducers such as LRAs typically includes some form of excursion limiting, to protect the transducers from over-excursion events resulting from longer waveform playback (for example, where the mechanical Q factor is high as with a typical LRA, longer signals at resonance are more likely to develop over-excursion). Over excursion in this context may be consider the pushing of a driver up to (or, in some cases, beyond) its mechanical limits, so that for example a vibrating mass of a vibrational transducer travels beyond its safe operational limit and even to the point of impacting a mechanical limit or stop.

It has been found that existing control of vibrational transducers has limitations, in particular regarding over-excursion protection.

It is desirable to address some or all of the above problems. It is desirable to provide an improved technique for vibrational transducer control.

SUMMARY

According to a first aspect of the present disclosure, there is provided a method of controlling a vibrational transducer, the method comprising: tracking a temperature metric of the vibrational transducer; and controlling a drive signal for the vibrational transducer, where the drive signal is limited to a value to protect the vibrational transducer from over excursion, and where said value is a function of the tracked temperature metric.

The temperature metric may be indicative of the temperature of the vibrational transducer, for example representative of the temperature (e.g. average temperature) of the overall vibrational transducer. The vibrational transducer may be an LRA or another a resonant actuator, motor or vibration motor. By controlling the value to be a function of the tracked temperature metric, the over-excursion protection may be adjusted so as to be substantially temperature independent, or less dependent on the temperature of the vibrational transducer. In this way, the performance or lifetime of a vibrational transducer may be made less dependent on the temperature of the vibrational transducer. The vibrational transducer may be protected from over excursion by limiting its excursion to a value which prevents, or reduces the chance of, mechanical clipping. The excursion may be limited by limiting the drive signal, for example limiting a maximum value of the drive signal in time domain or limiting a peak (or a peak within a limited frequency range) of a frequency response of the drive signal.

The tracking may be carried out continuously, or periodically or from time-to-time, depending on the application. The drive signal may be, for example, a voltage (i.e. voltage mode) signal, and may be generated based on an input signal which may also be a voltage signal, for example based on a gain which defines a relationship between the two signals. The gain may be controlled to be a function of the temperature metric.

According to a second aspect of the present disclosure, there is provided a method of controlling a vibrational transducer, the method comprising: tracking a temperature metric of the vibrational transducer; and controlling a drive signal for the vibrational transducer, where the drive signal is limited to a value that reduces, or protects against, or reduces a probability of, mechanical clipping of the vibrational transducer, where the value is a function of the tracked temperature metric.

According to a third aspect of the present disclosure, there is provided a method of controlling a vibrational transducer, the method comprising: tracking a temperature metric of the vibrational transducer; deriving a transducer excursion limit based on the tracked temperature metric; and (dynamically) adjusting a drive signal for the vibrational transducer based on the derived excursion limit, to prevent, or protect against, or reduce a probability of, clipping of the vibrational transducer.

According to a fourth aspect of the present disclosure, there is provided a method of controlling a vibrational transducer, the method comprising: tracking a temperature metric of the vibrational transducer; and adapting a feedforward excursion prediction model for the vibrational transducer based on the tracked temperature metric; and controlling the vibrational transducer based on the adapted feedforward excursion prediction model.

According to a fifth aspect of the present disclosure, there is provided a method of controlling a vibrational transducer, the method comprising: tracking a dynamic metric indicative of at least one dynamic characteristic of the vibrational transducer; and limiting a drive signal for driving the vibrational transducer to a value to protect the vibrational transducer from over excursion, wherein said value is a function of the tracked dynamic metric.

According to a sixth aspect of the present disclosure, there is provided a method of controlling a vibrational transducer, the method comprising: tracking a temperature metric indicative of a temperature of the vibrational transducer; and limiting a drive signal for driving the vibrational transducer to a value to protect the vibrational transducer from over excursion, wherein said value is a function of the tracked temperature metric.

According to a seventh aspect of the present disclosure, there is provided a method of controlling a vibrational transducer, the method comprising: tracking a temperature of the vibrational transducer; and limiting a drive signal for driving the vibrational transducer to a value to protect the vibrational transducer from over excursion, wherein said value is a function of the tracked temperature.

According to an eighth aspect of the present disclosure, there is provided a method of controlling a vibrational transducer, the method comprising: tracking a temperature of the vibrational transducer; and generating a drive signal for driving the vibrational transducer based on an input signal according to a defined relationship, said relationship configured to protect the vibrational transducer from over excursion, wherein said relationship is a function of the tracked temperature.

According to a ninth aspect of the present disclosure, there is provided a computer program which, when executed on a controller connected for controlling a vibrational transducer, causes the controller to carry out the method of any of the preceding aspects.

According to a tenth aspect of the present disclosure, there is provided a computer-readable storage medium having the computer program of the ninth stored thereon.

According to an eleventh aspect of the present disclosure, there is provided a controller for controlling a vibrational transducer, the controller configured to carry out the method of any of the first to eighth aspects, optionally wherein the controller is implemented as an integrated circuit (IC), optionally comprising a processor.

According to a twelfth aspect of the present disclosure, there is provided a vibrational-transducer system, comprising: the controller according to the eleventh aspect; and the vibrational transducer, wherein the controller is connected to drive the vibrational transducer with the drive signal.

According to a thirteenth aspect of the present disclosure, there is provided a host device, being an electrical or electronic device, comprising the controller according to eleventh aspect or the vibrational-transducer system according to the twelfth aspect, optionally wherein the host device comprises a cellphone, laptop, tablet computer or other personal device.

Also envisaged are corresponding method aspects, computer program aspects and storage medium aspects. Features of one aspect may be applied to another and vice versa.

BRIEF DESCRIPTION OF THE DRAWINGS

Reference will now be made, by way of example only, to the accompanying drawings, of which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Previously-considered excursion protection approaches usually predict the excursion, using a prediction model, and limit it to avoid over-excursion. Such prediction models are typically based on features of the vibrational transducer that are characterized prior to use. The assumption is that the characteristics will not change due to aging or environment.

However, the inventors have investigated vibrational transducer performance, and determined that transducer (e.g. LRA) characteristics change due to ageing, as well as environmental changes such as changes in temperature and/or pressure—especially temperature. Temperature change is very common when using a host device, such as a mobile device, and could be due to ambient temperature changes and/or the device heating up due to its own operation.

Figure 1:
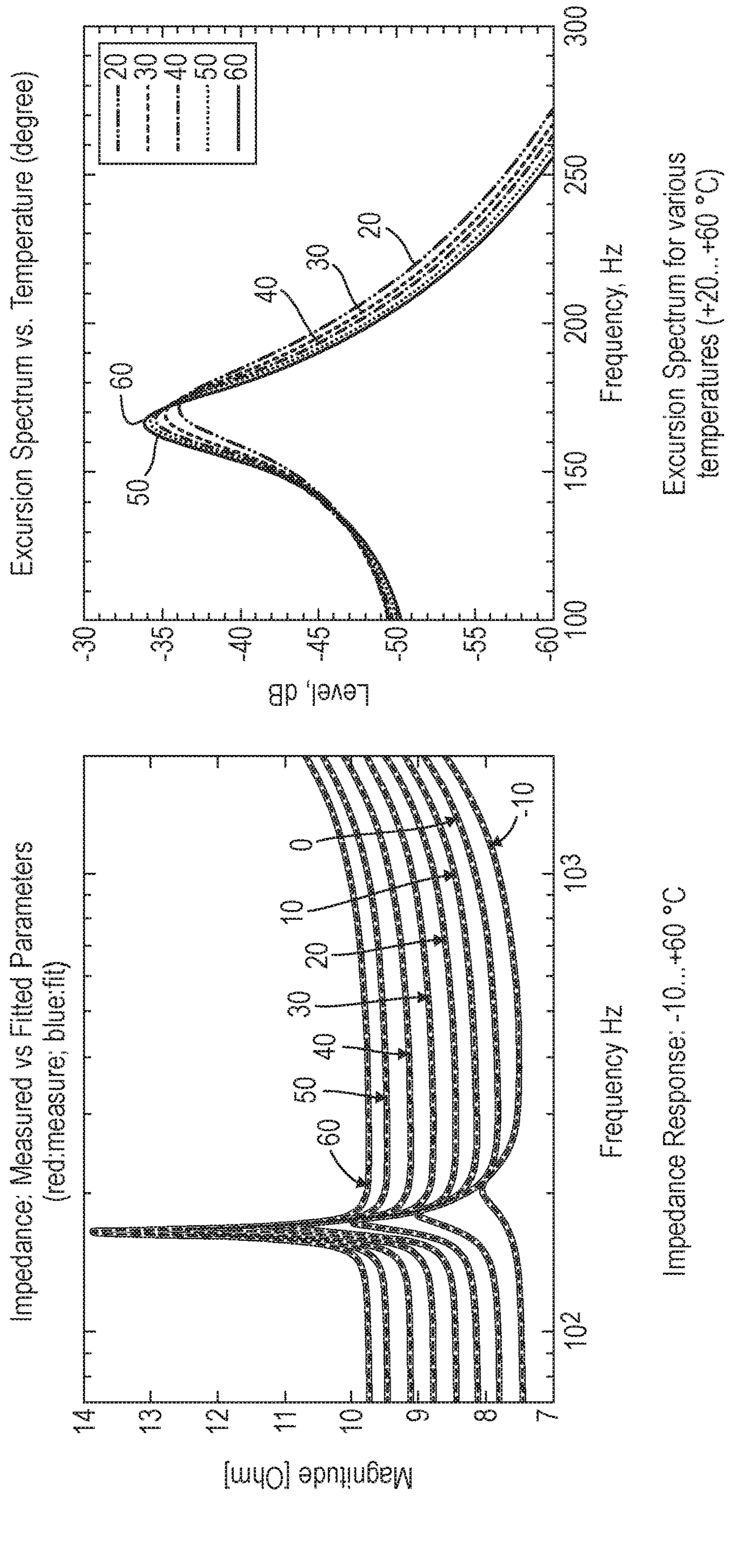
FIG. 1 presents plots to illustrate the effect of temperature on characteristics of an LRA.

FIG. 1 presents plots to illustrate the effect of temperature (shown in degrees Celsius) on characteristics of an LRA as an example vibrational transducer. The left-hand plot shows the effect of temperature on impedance response, at 10-degree intervals from −10° C. to 60° C. The right-hand plot shows the effect of temperature on excursion spectrum at 10-degree intervals from 20° C. to 60° C. In both cases, differences in response based on temperature are evident. For example, in the right-hand plot there is an approximate 3-4 dB change in the peak value as well as a shift in the peak (resonant) frequency. It is noted here that the temperature is the temperature of the overall or whole transducer rather than the temperature of just a coil or voice coil of the transducer.

Figure 2:
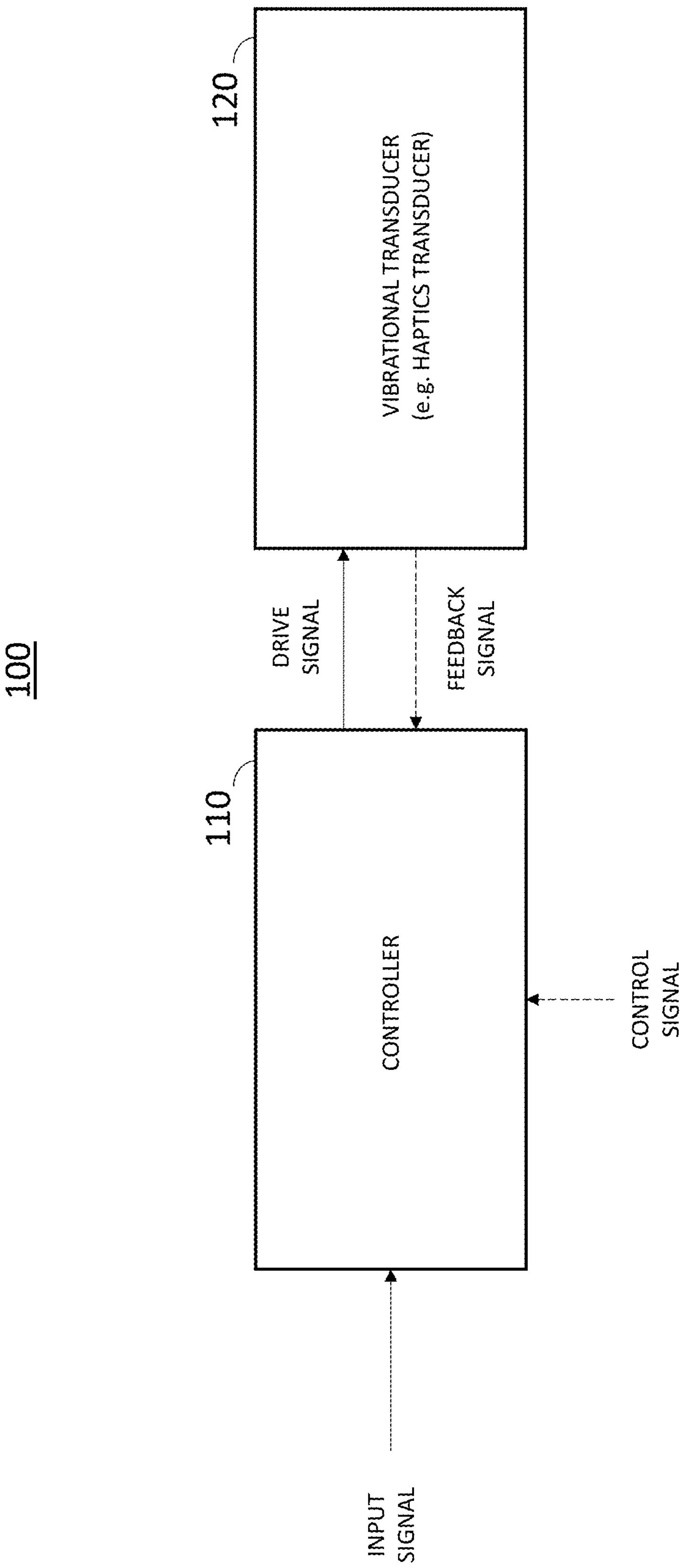
FIG. 2 is a schematic diagram of an example vibrational-transducer system according to an embodiment.
Figure 3:
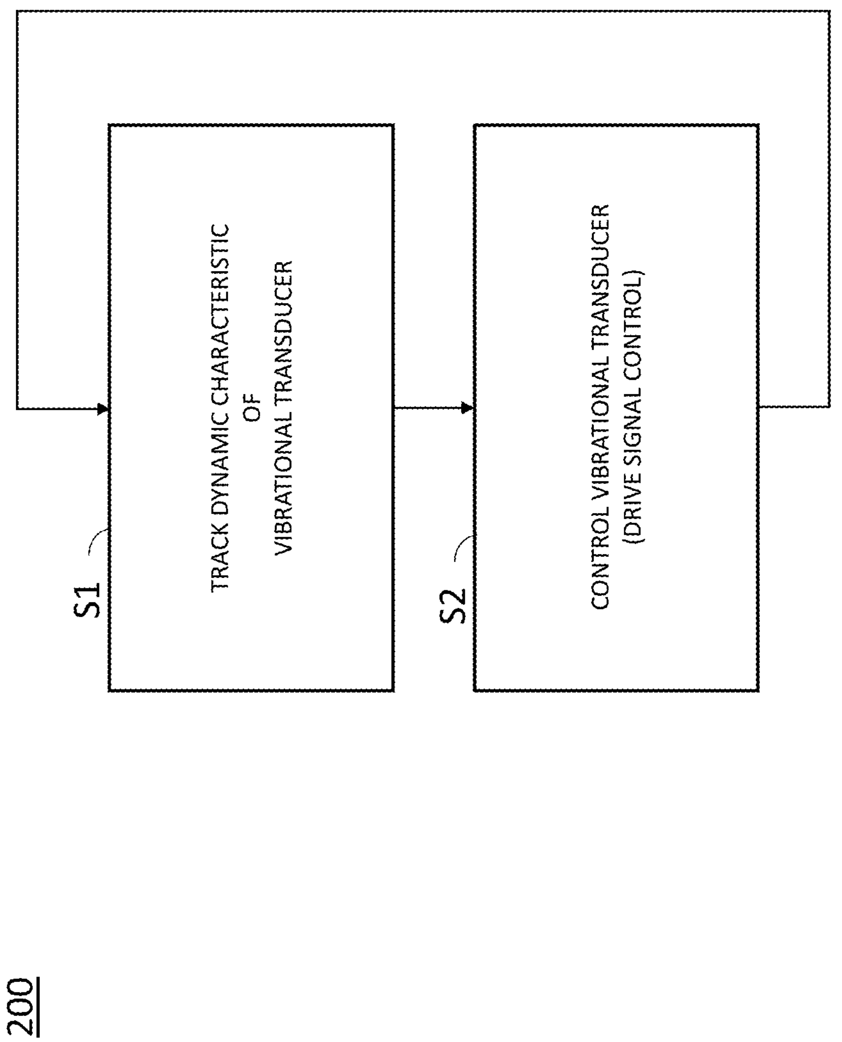
FIG. 3 is a flowchart presenting a control method according to an embodiment.

FIG. 2 is a schematic diagram of an example vibrational-transducer system 100. FIG. 3 is a flowchart presenting a control method 200 corresponding to the operation of the vibrational-transducer system 100.

The vibrational-transducer system 100 comprises a controller 110 and a vibrational transducer 120. The controller 110 may be implemented in any combination of hardware and software. For example, and as explained in more detail in connection with FIG. 4, the functionality of the controller 110 may be implemented as a computer program, which may be provided on a computer-readable storage medium and which may be executed on a processor of the controller 110.

With reference to FIGS. 2 and 3, the controller 110 is connected to drive the vibrational transducer 120 with the drive signal, and is configured to carry out the control method 200. The method 200 comprises tracking a dynamic metric (step S1) indicative of at least one dynamic characteristic or property of the vibrational transducer 120, and limiting the drive signal (step S2) to a value to protect the vibrational transducer 120 from over excursion, wherein the value is a function of the tracked dynamic metric. The method steps S1 and S2 may repeat as indicated so that the control of the vibrational transducer 120 adapts to changes in dynamic metric.

The dynamic metric may be indicative of one or more of the temperature, ambient pressure and age (as examples of dynamic characteristics or properties) of the vibrational transducer 120. For example, the dynamic metric may be a temperature metric and be indicative of a temperature of the vibrational transducer 120.

With the example temperature metric in mind, the method 200 may be considered to track the temperature metric, and control the drive signal, where the drive signal is limited to a value to protect the vibrational transducer from over excursion, and where the value is a function of the tracked temperature metric.

The method 200 may comprise limiting a voltage or current of the drive signal to protect the vibrational transducer from over excursion (i.e. the drive signal may be a voltage mode or a current mode signal). As such, the value may be a voltage limit value or a current limit value. For example, voltage limit value or a current limit value may be retrieved from memory based on the tracked temperature metric. In overview, the controller 110 may be considered to implement a control model (which controls the drive signal, based on at least the input signal), and which may be or comprise a predictive model. Method 200 may comprise adapting/adjusting such a control model or predictive model based on the tracked temperature metric. It may be estimated whether excursion of the vibrational transducer is close to over excursion and/or a clipping condition based on the temperature metric, and the value may be set based on the estimation. For example, the value may derived from an excursion model adapted using the temperature metric.

In example implementation, a set of said values, being limit values, may be defined or stored, for example in a look-up table, those limit values corresponding respectively to different values or ranges of values of the temperature metric. A limit value may then be selected based on the correspondence between the limit values and values of the temperature metric.

The drive signal may be considered generated in real time based on an input signal as indicated. As also indicated, the control may be at least partly carried out based on a feedback signal from the vibrational transducer 120 and/or a control signal provided to the vibrational transducer 120. In the context of temperature, current and/or voltage signals, or a power signal, indicative of the power consumed by the vibrational transducer 120, may be fed back from the vibrational transducer 120 to enable calculation/determination of the dynamic metric (temperature metric). In the context of ambient pressure or ageing, signals from a pressure sensor or clock may be supplied to the controller 110 as part of the control signal.

The input signal may be taken to be or to comprise a haptics output signal, and may comprise (or be generated from) an audio signal, a video signal, an audio-visual signal, an ultrasonic signal, an electromagnetic signal, a biometric signal, a synthetic signal (e.g. generated by a video game) and/or a sensor signal (e.g. generated by a microphone or force sensor).

Figure 4:
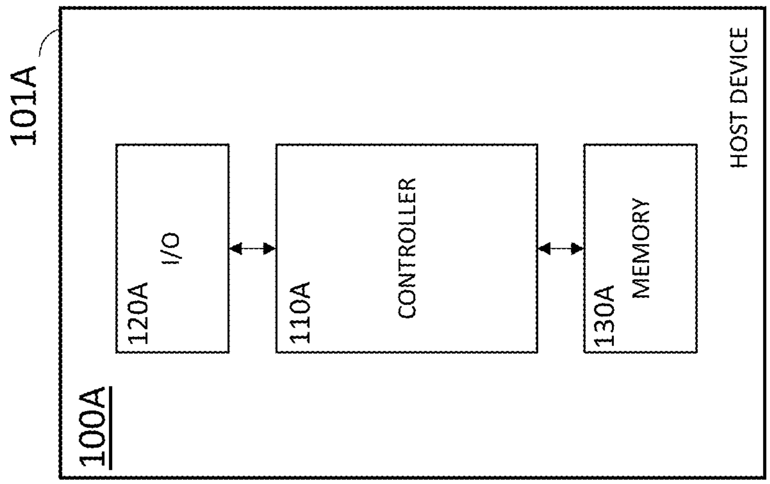
FIG. 4 is a schematic diagram of a host device according to an embodiment.

The vibrational-transducer system 100 may be implemented as a host device. FIG. 4 is a schematic diagram of a host device 100A, being an example implementation of the vibrational-transducer system 100. The host device 100A may be an electrical or electronic device. Example host devices 100A include a portable and/or battery powered host device such as a mobile telephone, a smartphone, an audio player, a video player, a PDA, a mobile computing platform such as a laptop computer or tablet and/or a games device.

As shown in FIG. 1, the host device 100A may comprise an enclosure 101A, a controller 110A, an input and/or output unit (I/O unit) 120A, and a memory 130A. Although shown separately in FIG. 1, the memory 130A could be considered part of the controller 110A. The controller 110A may be considered an example implementation of the controller 110 and the I/O unit 120A may be considered an example implementation of the vibrational transducer 120, and indeed may comprise an LRA as the vibrational transducer 120.

The enclosure 101A may comprise any suitable housing, casing, chassis or other enclosure for housing the various components of host device 100A. Enclosure 101A may be constructed from plastic, metal, and/or any other suitable materials. In addition, enclosure 101A may in some arrangements be adapted (e.g., sized and shaped) such that host device 100A is readily transported by a user (i.e. a person).

Controller 110A may be housed within enclosure 101A and may include any system, device, or apparatus configured to control functionality of the host device 100, including any or all of the memory 130A, and the I/O unit 120A. Controller 110A may be implemented as digital or analogue circuitry, in hardware or in software running on a processor, or in any combination of these.

Thus controller 110A may include any system, device, or apparatus configured to interpret and/or execute program instructions or code and/or process data, and may include, without limitation a processor, microprocessor, microcontroller, digital signal processor (DSP), application specific integrated circuit (ASIC), FPGA (Field Programmable Gate Array) or any other digital or analogue circuitry configured to interpret and/or execute program instructions and/or process data. Thus the code may comprise program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware. Processor control code for execution by the controller 110A may be provided on a non-volatile carrier medium such as a disk, CD- or DVD-ROM, programmed memory such as read only memory (Firmware), or on a data carrier such as an optical or electrical signal carrier. The controller 110A may be referred to as control circuitry and may be provided as, or as part of, an integrated circuit such as an IC chip.

Memory 130A may be housed within enclosure 101A, may be communicatively coupled to controller 110A (or be part of the controller 110A), and may include any system, device, or apparatus configured to retain program instructions and/or data for a period of time (e.g., computer-readable media). In some embodiments, controller 110A interprets and/or executes program instructions and/or processes data stored in memory 130A and/or other computer-readable media accessible to controller 110A.

The I/O unit 120A may be housed within enclosure 101A, may be distributed across the host device 100A (i.e. it may represent a plurality of units) and may be communicatively coupled to the controller 110. Although not specifically shown in FIG. 4, the I/O unit 120A comprises an LRA (as an example implementation of the vibrational transducer 120), i.e. a device capable of outputting a force, such as a vibration.

The I/O unit 120A may (in addition) comprise any or all of a microphone, a radio (or other electromagnetic) transmitter/receiver, a speaker, a display screen (optionally a touchscreen), an indicator (such as an LED), a sensor (e.g. force sensor, accelerometer, temperature sensor, gyroscope, camera, tilt sensor, electronic compass, etc.) and one or more buttons or keys. Example force sensors include or comprise capacitive displacement sensors, inductive force sensors, strain gauges, piezoelectric force sensors, force sensing resistors (resistive force sensors), piezoresistive force sensors, thin film force sensors and quantum tunnelling composite-based force sensors. However, focus herein will be placed on control of the LRA as an example of the vibrational transducer 120 rather than on such possible additional elements of the I/O unit 120A. As such, for simplicity, the I/O unit 120A may be referred to hereinafter as the LRA 120A.

With the presence of the LRA 120A (as an example haptics transducer), the host device 100A may be considered a haptics-enabled device. Some aspects of the present disclosure, for example the controller 110A (or the controller 110), may be arranged as part of a haptics circuit, for instance a haptics circuit which may be provided in the host device 100A. A circuit or circuitry embodying aspects of the present disclosure (such as the controller 110 or 110A) may be implemented (at least in part) as an integrated circuit (IC), for example on an IC chip. One or more input or output transducers (such as LRA 120A) may be connected to the integrated circuit in use.

For ease of understanding, a running example will be adopted where the vibrational transducer 120 will be assumed to be an LRA and the dynamic metric will be assumed to be a temperature metric and be indicative of a temperature of the LRA. However, it will be understood that the LRA is an example of a vibrational transducer, and the temperature metric is an example of a dynamic metric. The present disclosure will be understood accordingly. Of course, an LRA is simply a convenient example vibrational transducer; the vibrational transducer (in this context, haptics transducer) may be a resonant actuator or a motor or vibration motor (such as an eccentric rotating mass vibration motor).

Figure 5:
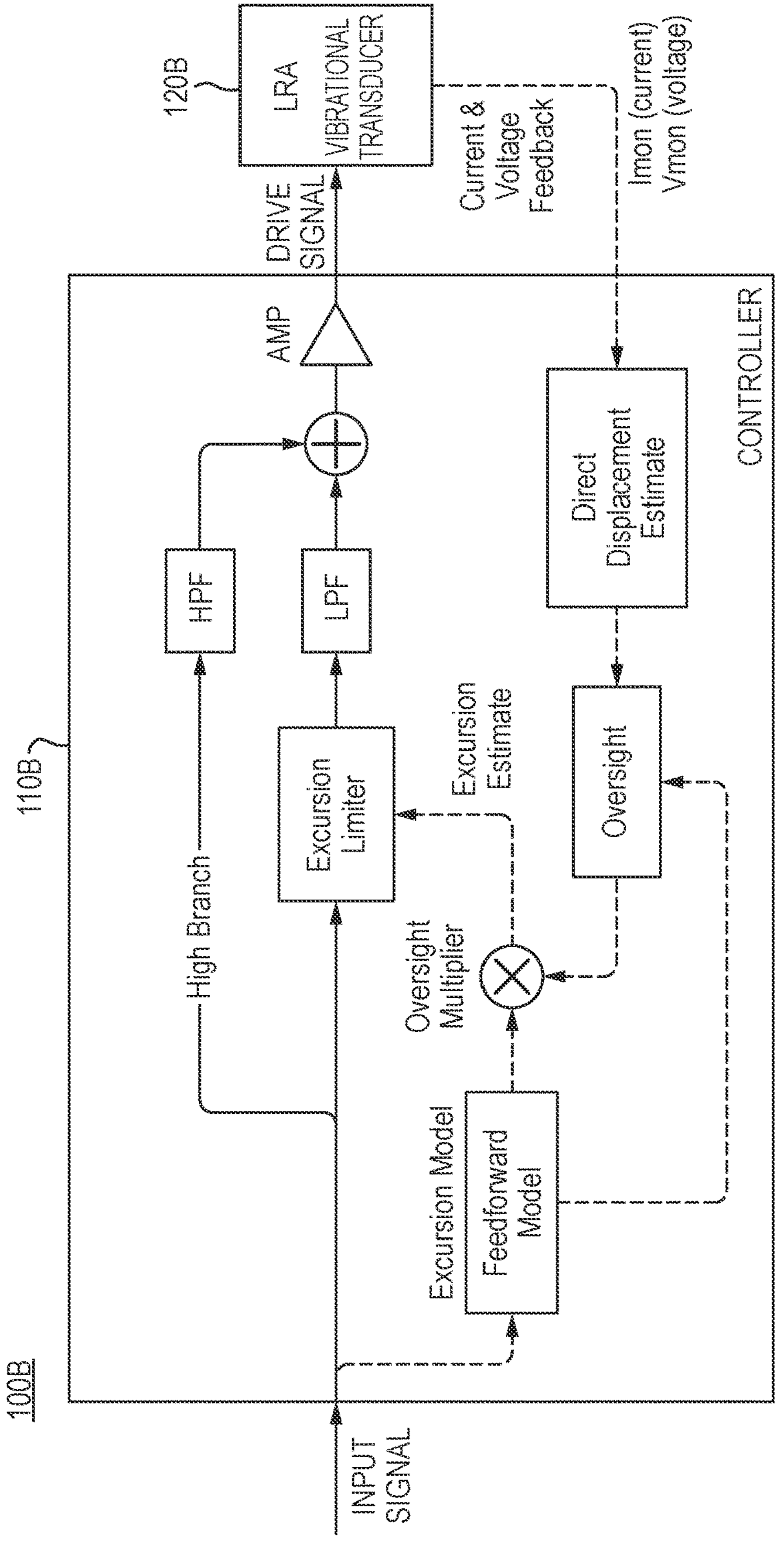
FIG. 5 is a schematic diagram of an example vibrational-transducer system according to an embodiment.

FIG. 5 is a schematic diagram of an example vibrational-transducer system 1008, being an example implementation of the vibrational-transducer system 100 (or, similarly, 100A). The vibrational-transducer system 100B comprises a controller 1108 and an LRA 1208, as example implementations of the controller 110 and the vibrational transducer 120, respectively.

Although not explicitly shown in FIG. 5, but apparent from FIGS. 6 to 10 as described later, the controller 1108 is configured to carry out the control method 200 so as to adapt control of the LRA 120B based on its temperature. As indicated in FIG. 5, a current-monitoring signal Imon and a voltage-monitoring signal Vmon are fed back to the controller 1108 as an example of the feedback signal in FIG. 1. The current-monitoring signal Imon is indicative of the current drawn by the LRA 120B and the voltage-monitoring signal Vmon is indicative of the voltage across (an impedance or effective impedance of) the LRA 1208. These signals can be used to determine the power drawn by the LRA 1208.

Vibrational-transducer system 1008, in particular controller 1108, is useful for understanding in more detail how the drive signal may be controlled in an example implementation, and in particular how over-excursion protection may be performed. An associated example configuration for adapting such drive signal control based on a temperature metric is then described in connection with FIGS. 6 to 10.

Considering the controller 1108 itself, the drive signal output to the LRA 1208 is generated based on a received input signal. In detail, the input signal is separated into high-frequency and low-frequency portions passing along respective circuit branches by frequency filtering (see the high-pass filter, HPF, and the low-pass filter, LPF), which portions are then summed. The result of the summation is amplified to generate the drive signal. The low-frequency portion of the input signal passes via an excursion limiter which operates to limit that portion (and thus the relevant portion of the drive signal) thereby to ensure that the LRA 120B is protected from over-excursion. It is noted that the low-pass filtering occurs after the excursion limiter in FIG. 5, however in other implementations it may occur before the excursion limiter. The division into high-frequency and low-frequency portions is not essential—the excursion limiter may act on the input signal across the applicable frequency bandwidth.

Keeping in mind the LRA 120B, the drive signal is produced as an AC voltage to drive—within the LRA 120B—a (voice) coil to cause a moving mass connected to a spring to vibrate along a main axis, causing the entire LRA 120B to vibrate (with a human-perceptible force) particularly when driven at the resonant frequency of the spring/mass combination. By limiting the low-frequency portion and thus the relevant portion of the drive signal, the magnitude of the vibration of the mass can be limited to protect the LRA 120B from over-excursion. Over excursion in this context may be consider the driving of the mass beyond a given safe limit or even up to its mechanical limits, to the point of impacting a mechanical limit or stop.

The excursion limiter is controlled based on an excursion estimate, i.e. an estimate of how far the mass has travelled along the main axis. This excursion estimate is based upon a modelled excursion generated by a feedforward model (an excursion prediction model) based on the input signal, and based on a direct displacement estimate generated (by a direct displacement model) based on the current-monitoring signal Imon and the voltage-monitoring signal Vmon. The direct displacement estimate is supplied to an oversight unit along with an output from the feedforward model, and the oversight unit outputs a value which is multiplied by modelled excursion to generate the excursion estimate.

In overview, the excursion limiter may be considered a form of amplifier that applies a gain (whose value may vary with frequency) to the low-frequency portion of the input signal, and that gain may be controlled based on the excursion estimate. With the gain being frequency dependent (i.e. having a non-flat frequency response), it may be understood that the value to which the drive signal is limited may also have a non-flat frequency response, but the limiting may in effect limit the peak of the frequency response and have the effect of limiting the peak excursion in time domain.

Figure 6:
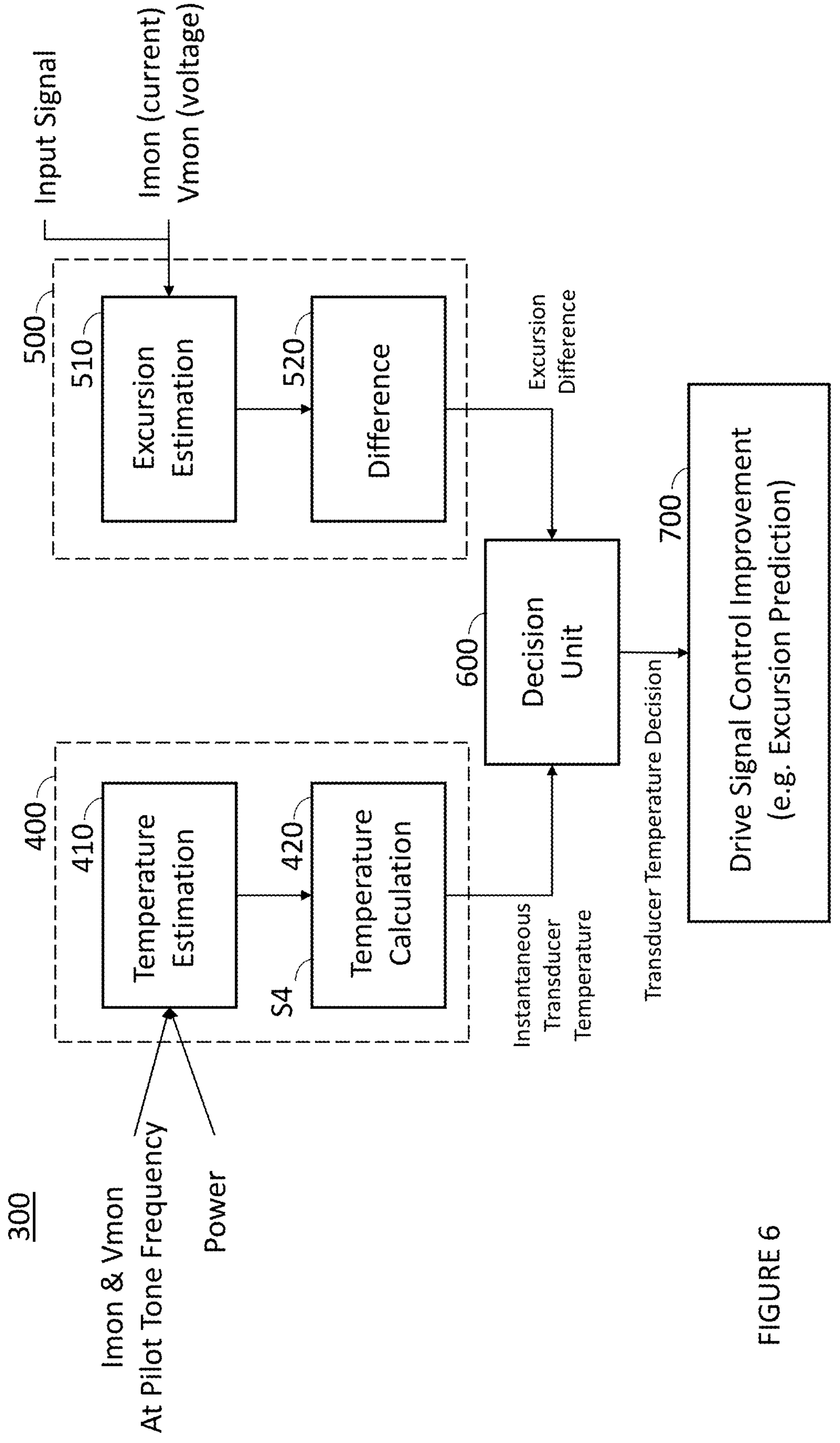
FIG. 6 is a schematic diagram of a subsystem of the controller of FIG. 5, according to an embodiment.

FIG. 6 is a schematic diagram of a subsystem 300 of the controller 1108 (and which may also be implemented in the controller 110A or 110), and FIGS. 7 to 10 are schematic diagrams of respective parts of the subsystem 300.

The subsystem 300 comprises a temperature tracking unit 400, an excursion difference tracking unit 500, a decision unit 600 and a drive signal control improvement unit 700. As considered in more detail in FIGS. 7 to 10, the temperature tracking unit 400 comprises a temperature estimation unit 410 and a temperature calculation unit 420, and the excursion difference tracking unit 500 comprises an excursion estimation unit 510 and a difference unit 520. The units could be considered blocks or subcomponents or elements of the subsystem 300, or similar.

The functionality of the subsystem 300 could implemented as an algorithm, for example expressed in a computer program executed by the controller 1108. Thus, the distribution of the overall functionality between different units as in FIGS. 6 to 10 is merely for ease of understanding.

To improve the performance of an excursion protection system due to temperature change, the subsystem 300 tracks the LRA 1208 (haptics transducer, or vibrational transducer) temperature in real time with the temperature tracking unit 400, estimates an excursion difference (being the difference between a modelled excursion and a direct displacement estimate) with the excursion difference tracking unit 500, generates a transducer temperature decision based on the tracked LRA 1208 temperature and/or the estimated excursion difference with decision unit 600, and adapts or controls one or more of the units of the controller 1108 based on the transducer temperature decision to affect the over-excursion protection using the drive signal control improvement unit 700.

Looking at FIG. 5, the drive signal control improvement unit 700 may therefore adapt (based on the temperature metric), for example, one or more of the feedforward model (excursion prediction model), the direct displacement unit (direct displacement model), the oversight unit and the excursion limiter (amplifier), to affect the over-excursion protection. For example, parameters of the feedforward model (excursion prediction model) may be adjusted, parameters of the direct displacement unit (direct displacement model) may be adjusted, parameters of the oversight unit may be adjusted, and/or parameters (such as gain) of the excursion limiter itself (amplifier) may be adjusted, to affect the over-excursion protection.

In effect, the drive signal may be controlled based on the tracked LRA 1208 temperature, i.e. by adapting how the drive signal is controlled (at least one factor of the control system) based on the tracked LRA 120B temperature. The drive signal of the LRA 1208 may be controlled such that the drive voltage is limited to a value that reduces mechanical clipping, or the probability or chance thereof, where the value is a function of the tracked temperature.

Figure 7:
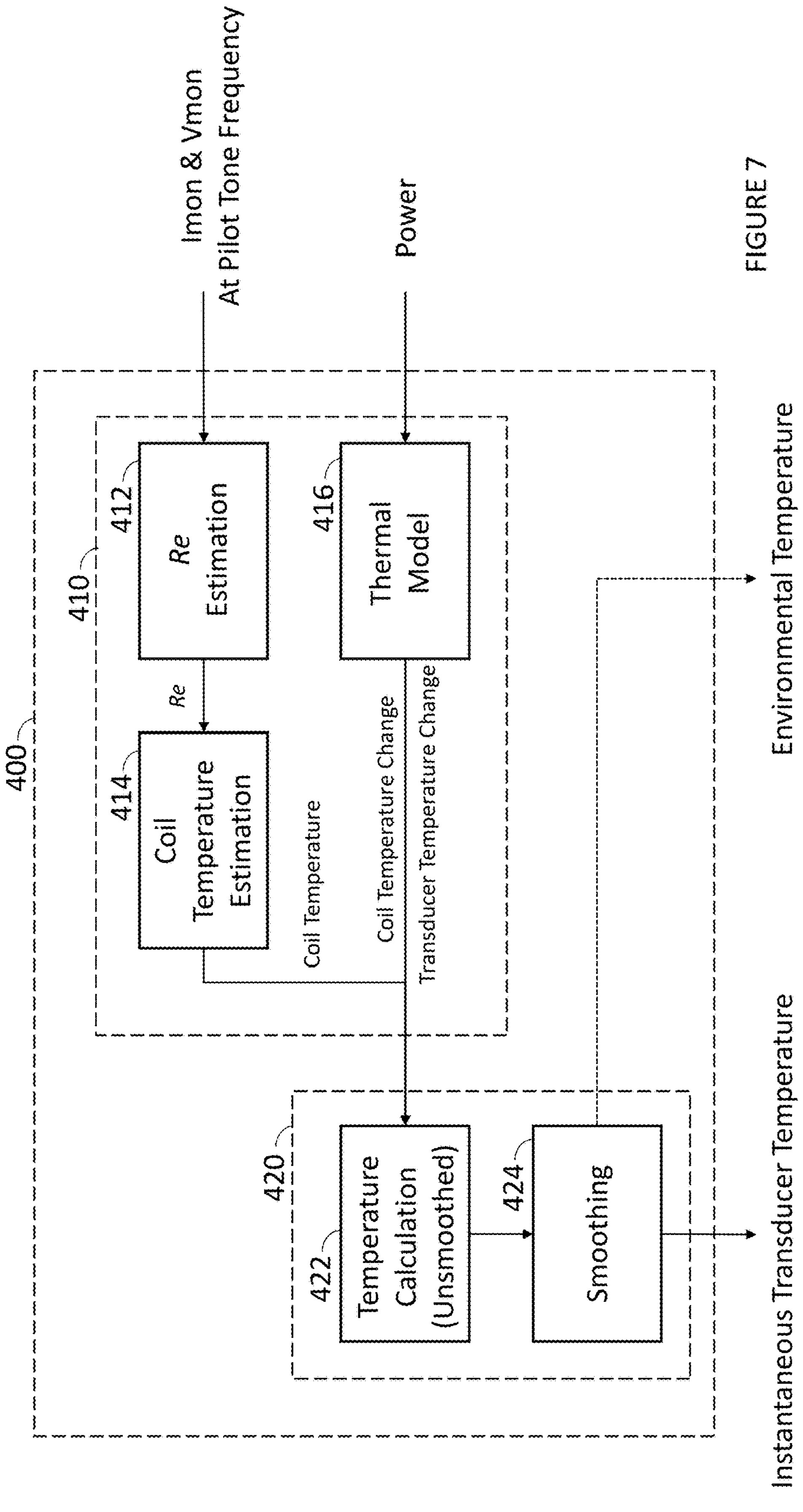
FIGS. 7 to 10 are schematic diagrams of respective parts of the subsystem of FIG. 6.

FIG. 7 is a schematic diagram of the temperature tracking unit 400, comprising the temperature estimation unit 410 and the temperature calculation unit 420.

The temperature estimation unit 410 comprises an Re estimation unit 412, a coil temperature estimation unit 414 and a thermal model unit 416. The temperature calculation unit 420 comprises a temperature calculation (unsmoothed) unit 422 and a smoothing unit 424.

The Re estimation unit 412 is configured to estimate the Re for the coil (e.g. voice coil) of the LRA 120B, where Re is the DC resistance of the coil. A pilot tone is supplied to the LRA 120B via the drive signal, and the amplitude of the current-monitoring signal Imon and voltage-monitoring signal Vmon at the pilot tone frequency are extracted from the current-monitoring signal Imon and voltage-monitoring signal Vmon. The pilot tone voltage amplitude (level) may be divided by the pilot tone current amplitude (level) to arrive at an estimate of the resistance Re.

The coil temperature estimation unit 414 uses the estimate of the resistance Re to estimate the temperature of the coil $T_{coil}$ based on a given resistance-to-temperature conversion relationship.

The thermal model unit 416 is configured to use the input power of the LRA 1208 as an input to a thermal model to track the coil temperature change $T_{c\text{-}model}$ and also to track the transducer temperature change $T_{LRA\text{-}model}$. The input to the thermal model is power (i.e. power consumed or drawn by the LRA 120B), and the outputs of the model are coil and LRA temperature changes caused by the input power.

The temperature calculation (unsmoothed) unit 422 is configured, based on the values estimated by the temperature estimation unit 410 as above, to evaluate the environment temperature $T_e$ according to:

$$T_e = T_{coil} - T_{C\text{-}model}$$

and to evaluate the LRA temperature according to:

$$T_{LRA} = T_e + T_{LRA\text{-}model} = T_{coil} - T_{C\text{-}model} + T_{LRA\text{-}model}$$

The smoothing unit 424 then performs smoothing (e.g. low-pass filtering) to remove noise and any other high-frequency artifacts, tracking long-term or low-frequency temperature changes, and outputs the (smoothed) instantaneous transducer temperature. Also output, although optional, may be the (smoothed) environmental temperature, for example for use by another system or subsystem.

Of course, if there is a thermal sensor close to the LRA 1208, that sensor could be used to track the LRA temperature instead of tracking it as above.

Figure 8:
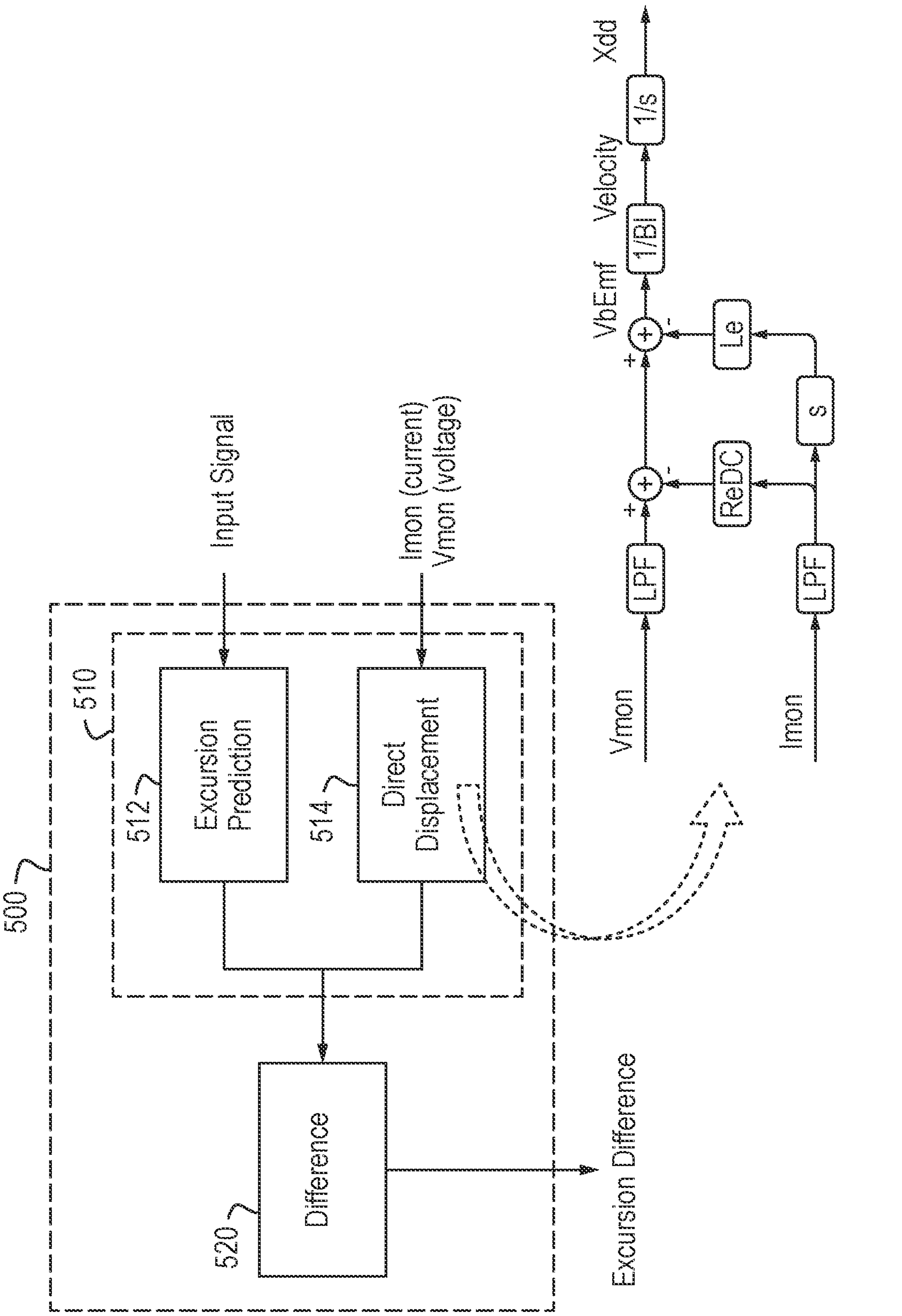

FIG. 8 is a schematic diagram of the excursion difference tracking unit 500, comprising the excursion estimation unit 510 and the difference unit 520.

The excursion estimation unit 510 comprises an excursion prediction unit 512 and a direct displacement unit 514. The excursion prediction unit 512 is configured to output a modelled excursion generated by a feedforward model (an excursion prediction model) based on the input signal, and thus may be the same unit as, or another instance of, the feedforward model unit of FIG. 5. The direct displacement unit 514 is configured to output a direct displacement estimate generated (by a direct displacement model) based on the current-monitoring signal Imon and the voltage-monitoring signal Vmon, and thus may be the same unit as, or another instance of, the direct displacement estimate unit of FIG. 5.

The difference unit 520 is configured to calculate or determine the difference between the modelled excursion and the direct displacement estimate generated by the excursion estimation unit 510, and output this as an excursion difference, and thus may be the same unit as, or another instance of, the oversight unit of FIG. 5. As an implementation, the excursion difference may be calculated in the oversight unit and the oversight unit may output the decision (see unit 600) and gain adjustment to the limiter. An example implementation of the direct displacement model of the direct displacement unit 514 is given in FIG. 8 but this is just an example.

In overview, the excursion estimation unit 510 therefore calculates the difference between the excursion model output and the direct displacement. The more temperature changes, the greater will be the observed difference. It will be appreciated, e.g. from FIG. 9, that the output excursion difference may be buffered and smoothed, tracking the long-term difference.

Figure 9:
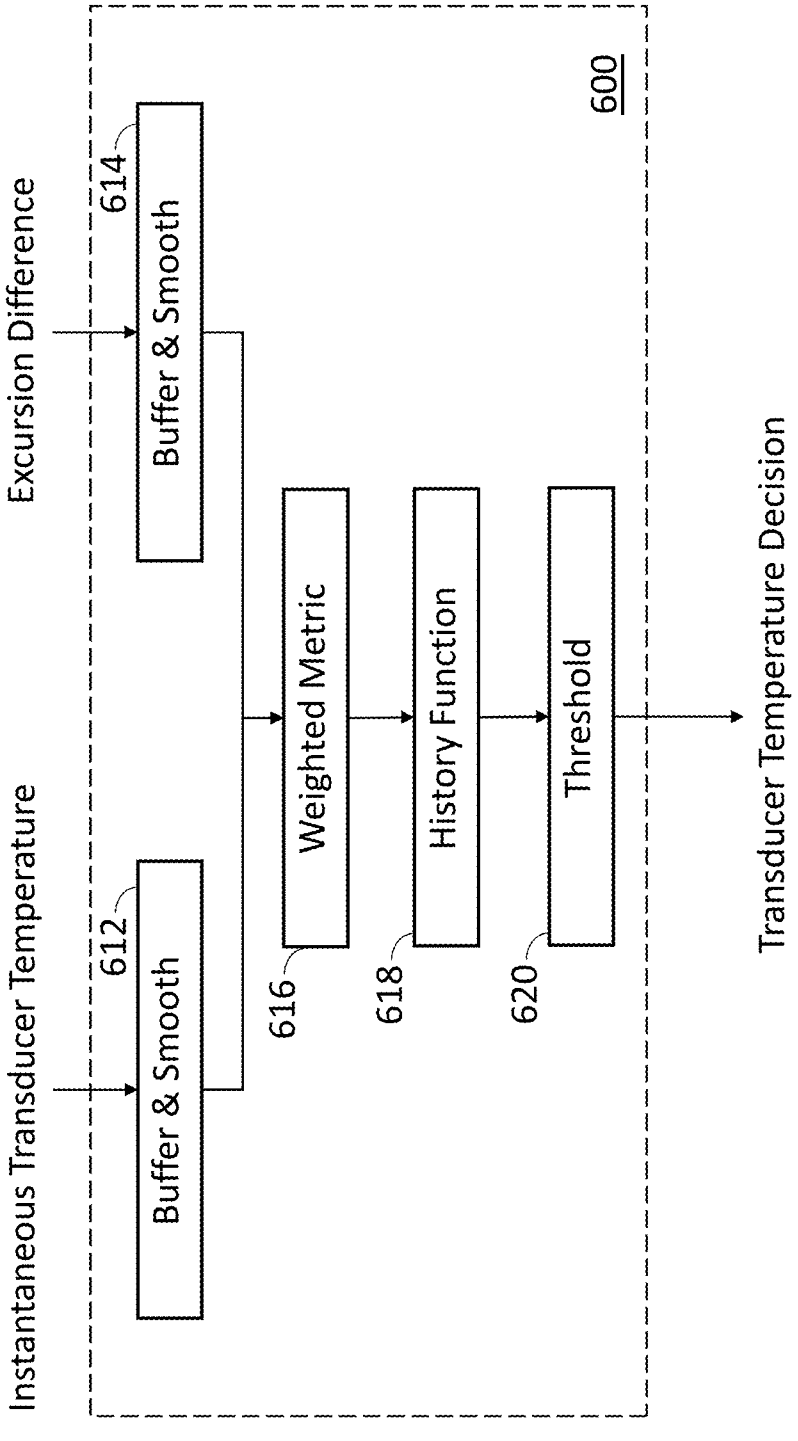

FIG. 9 is a schematic diagram of the decision unit 600. The decision unit 600 comprises buffer and smooth units 612 and 614, a weighted metric unit 616, a history function unit 618 and a threshold unit 620.

The buffer and smooth units 612 and 614 are configured to receive the instantaneous transducer temperature and the excursion difference from the temperature tracking unit 400 and the excursion difference tracking unit 500, respectively, and output corresponding smoothed signals to the weighted metric unit 616. Buffering and smoothing may be optional in some arrangements.

The weighted metric unit 616 is configured to combine the (smoothed) instantaneous transducer temperature and the (smoothed) excursion difference and to generate a temperature metric therefrom, for example as a weighted combination of the (smoothed) instantaneous transducer temperature and the (smoothed) excursion difference.

For example, the weighting may be biased more, or even fully, to the (smoothed) instantaneous transducer temperature. That is to say, the (smoothed) instantaneous transducer temperature may serve as the temperature metric in some arrangements. In some arrangements, the (smoothed) excursion difference may serve as the temperature metric. In other arrangements, the (smoothed) instantaneous transducer temperature may be weighted and combined with the (smoothed) excursion difference to provide the temperature metric.

The history function unit 618 is configured to store or buffer a history of temperature metric values, and the threshold unit 620 is configured to determine when a change in the temperature metric (or a value of the temperature metric) reaches a given or predefined threshold, in which case a transducer temperature decision may be made, triggering modification of the excursion limiting performed by the controller 1108. In this way, changes in (or levels of) the instantaneous transducer temperature and/or the excursion difference preferably do not immediately trigger modification of the excursion limiting. The system may effectively determine whether the excursion estimation is close to an overload condition based on the temperature change, and accordingly limit the excursion of the LRA 1208 based on the estimation.

Figure 10:
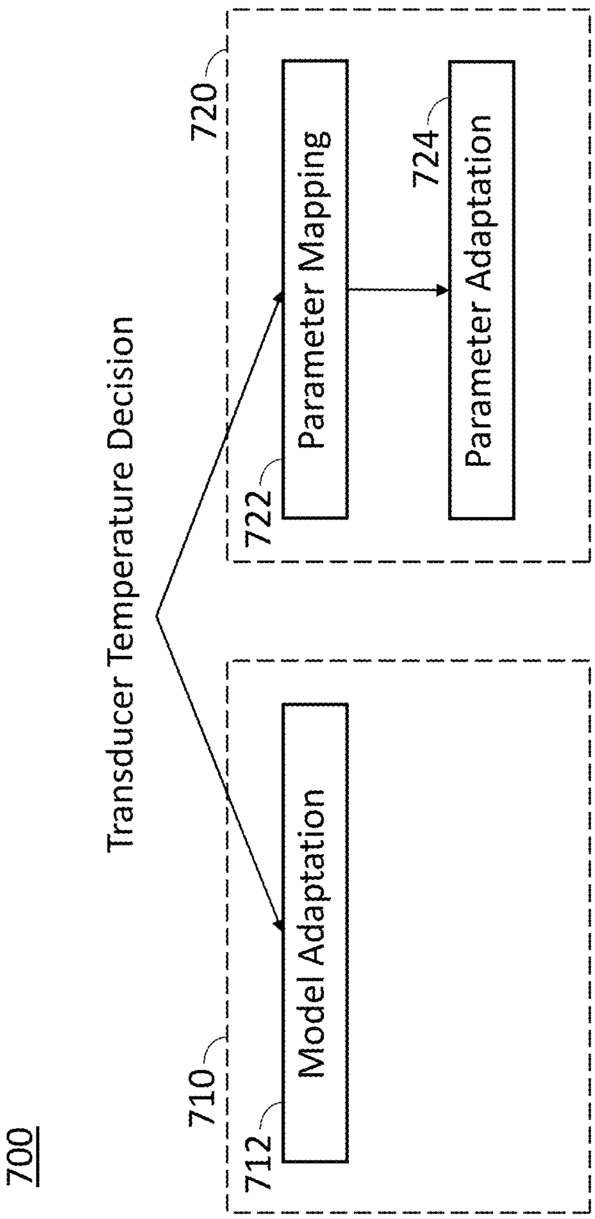

FIG. 10 is a schematic diagram of the drive signal control improvement unit 700, and is configured to control modification of the excursion limiting performed by the controller 1108 based on the transducer temperature decision of the decision unit 600.

As mentioned earlier, the drive signal control improvement unit 700 may adapt, for example, any parameter or element (or combination of parameters or elements) of the control of the drive signal performed by the controller 1108. The adapting or adjusting may be carried out successively, iteratively or dynamically, i.e. on-the-fly or when the controller is online or operating. The adapting or adjusting may be carried out from time to time, i.e. periodically or occasionally.

Looking at FIG. 5, the drive signal control improvement unit 700 may adapt, for example, one or more of the feedforward model (excursion prediction model), the direct displacement unit (direct displacement model), the oversight unit and the excursion limiter (amplifier), to affect the over-excursion protection. This may be carried out by selecting between different such models or adapting parameters of such models.

For example, unit 710 may be configured to update the feedforward model. Unit 710 may be configured to select between different feedforward models or adapt or update (e.g. continuously) parameters of the feedforward model with its model adaptation unit 712. For example, for each temperature data point of a temperature region of interest (for example at 20, 30, 40, 50, 60° C. intervals or levels), the LRA 120B may be characterized, and suitable model parameter values (or deltas compared to nominal parameter values) determined. Those values/deltas may be incorporated into separate feedforward models which can be selected between, or may be used to (e.g. seamlessly or continuously) update a single feedforward model. That is, based on the adaptation decision, switching of the feedforward models (i.e., choosing from multiple saved models) may be triggered. A similar approach may be applied to the direct displacement model, or to e.g. any calculation performed by the subsystem 300.

As another example, unit 720 may be configured to hold a parameter table in its parameter mapping unit 722, mapping different parameters to different temperature data points indicated by the transducer temperature decision of the decision unit 600. In this way, the parameter adaptation unit 724 may be configured to adapt parameters of the direct displacement model (and/or the excursion prediction model), based on the parameter mapping in the parameter table and the transducer temperature decision to (e.g. seamlessly or continuously) adapt that model. A similar approach may be applied to the feedforward model, or to e.g. any calculation performed by the subsystem 300.

As another example, not shown in FIG. 10, the drive signal control improvement unit 700 may be configured to adjust, adapt or change the gain of the excursion limiting based on the temperature change (i.e. the transducer temperature decision), for example the gain of the excursion limiter of FIG. 5.

As a summary, a temperature of the vibrational transducer is tracked, and a drive signal for the vibrational transducer is controlled based on the tracked temperature. As part of this control, the drive signal may be limited to a value to protect the vibrational transducer from over excursion, where the value is a function of the tracked temperature.

The skilled person will recognise that some aspects of the above-described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the haptics signal generator 200, 200A or 200B may be implemented as a processor operating based on processor control code. As another example, the controller 110 or 110A may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Some embodiments of the present invention may be arranged as part of an audio processing circuit, for instance an audio circuit (such as a codec or the like) which may be provided in a host device as discussed above. A circuit or circuitry according to an embodiment of the present invention may be implemented (at least in part) as an integrated circuit (IC), for example on an IC chip. One or more input or output transducers (such as an LRA) may be connected to the integrated circuit in use.

It should be noted that the above-mentioned embodiments illustrate rather than limit the invention, and that those skilled in the art will be able to design many alternative embodiments without departing from the scope of the appended claims. The word “comprising” does not exclude the presence of elements or steps other than those listed in the claim, “a” or “an” does not exclude a plurality, and a single feature or other unit may fulfil the functions of several units recited in the claims. Any reference numerals or labels in the claims shall not be construed so as to limit their scope.

As used herein, when two or more elements are referred to as “coupled” to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, “each” refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. Further embodiments likewise, with the benefit of this disclosure, will be apparent to those having ordinary skill in the art, and such embodiments should be deemed as being encompassed herein.

To aid the Patent Office (USPTO) and any readers of any patent issued on this application in interpreting the claims appended hereto, applicants wish to note that they do not intend any of the appended claims or claim elements to invoke 35 U.S.C. § 112(f) unless the words “means for” or “step for” are explicitly used in the particular claim.

The present disclosure extends to the following statements:

A1. A method of controlling a vibrational transducer, the method comprising:

- tracking a temperature metric of the vibrational transducer; and
- controlling a drive signal for the vibrational transducer, where the drive signal is limited to a value to protect the vibrational transducer from over excursion, and where said value is a function of the tracked temperature metric.

A2. The method according to statement A1, comprising adjusting said value based on the temperature metric to reduce, or at least partly compensate for an effect of, the temperature of the vibrational transducer on:

- the over-excursion protection; and/or
- mechanical clipping of the vibrational transducer; and/or
- a probability or risk of mechanical clipping of the vibrational transducer; and/or
- a rate of incidence of mechanical clipping of the vibrational transducer.

A3. The method according to statement A1 or A2, wherein:

- said temperature metric is indicative of a temperature of the vibrational transducer; and/or
- said temperature metric is a measure of the temperature of the overall vibrational transducer; and/or
- the vibrational transducer comprises a plurality of sub-components including a coil, and said temperature metric is a measure of the temperature, or a representative temperature, of a combination of the plurality of sub-components.

A4. The method according to statement A3, wherein the plurality of sub-components comprises the coil, an enclosure, a moveable mass, and a spring.

A5. The method according to any of the preceding statements, comprising generating said temperature metric based on one or more signals and/or electrical properties of the vibrational transducer.

A6. The method according to any of the preceding statements, comprising generating said temperature metric by at least one of:

- obtaining a reading from a thermal sensor of, or proximal to, the vibrational transducer;
- measuring an impedance of a coil of the vibrational transducer, and estimating a temperature of the coil based on the measured impedance;
- using a thermal model to track a temperature change of the coil based on input power to the vibrational transducer; and
- using a thermal model to track a temperature change of the (overall) vibrational transducer based on the input power to the vibrational transducer.

A7. The method according to any of the preceding statements, comprising:

- limiting a voltage or current of the drive signal to protect the vibrational transducer from over excursion, optionally wherein said value is a voltage limit value or a current limit value;
- retrieving a voltage limit value or a current limit value from a memory based on the tracked temperature metric; and/or
- controlling the drive signal by adapting a control model or a predictive model based on the tracked temperature metric; and/or
- estimating whether excursion of the vibrational transducer is close to over excursion and/or a clipping condition based on the temperature metric, and setting said value based on the estimation, optionally wherein the value is derived from an excursion model adapted using the temperature metric; and/or
- defining or storing, optionally in a look-up table, a set of said values, being limit values, corresponding respectively to different values or ranges of values of the temperature metric, and selecting a limit value based on the correspondence between said limit values and values of the temperature metric.

A8. The method according to any of the preceding statements, comprising generating the drive signal based on an input signal.

A9. The method according to statement A8, comprising generating said temperature metric based on an excursion difference, being a difference between a predicted excursion, predicted by an excursion prediction model based on the input signal or the drive signal, and a direct displacement value, generated based upon a current drawn by the vibrational transducer and/or a voltage across the vibrational transducer.

A10. The method according to statement A8 or A9, comprising:

- using an excursion prediction model to predict an excursion of the vibrational transducer based on the input signal;
- generating the drive signal based on the predicted excursion, or on the input signal and the predicted excursion; and
- (dynamically) adjusting the excursion prediction model based on the temperature metric to adjust said value.

A11. The method according to statement A10, wherein adjusting the excursion prediction model comprises at least one of:

- (dynamically) adjusting one or more parameters of the excursion prediction model; and
- selecting the excursion prediction model from a plurality of candidate excursion prediction models.

A12. The method according to any of statements A8 to A11, comprising:

- using a direct displacement model to generate a direct displacement value, being a measure of the excursion of the vibrational transducer, based upon a current drawn by the vibrational transducer and/or a voltage across the vibrational transducer;
- generating the drive signal based on the direct displacement value, or on the input signal and the direct displacement value; and
- (dynamically) adjusting the direct displacement model based on the temperature metric to adjust said value.

A13. The method according to statement A12, wherein adjusting the direct displacement model comprises at least one of:

- (dynamically) adjusting one or more parameters of the direct displacement model; and
- selecting the direct displacement model from a plurality of candidate direct displacement models.

A14. The method according to any of statements A8 to A13, comprising:

- calculating an excursion difference, being a difference between a predicted excursion, predicted by an excursion prediction model based on the input signal, and a direct displacement value, being a measure of the excursion of the vibrational transducer, generated by a direct displacement model based upon a current drawn by the vibrational transducer and/or a voltage across the vibrational transducer;
- generating the drive signal based on the excursion difference, or on the input signal and the excursion difference; and
- (dynamically) adjusting the excursion prediction model and/or the direct displacement model based on the temperature metric to adjust said value.

A15. The method according to claim A14, wherein adjusting the excursion prediction model and/or the direct displacement model comprises at least one of:

- (dynamically) adjusting one or more parameters of the excursion prediction model and/or the direct displacement model; and
- selecting the excursion prediction model and/or the direct displacement model from a plurality of candidate models.

A16. The method according to any of statements A8 to A15, comprising controlling a relationship between the drive signal and the input signal based on the temperature metric to adjust said value.

A17. The method according to statement A16, wherein the relationship comprises a gain between the drive signal and the input signal, optionally wherein the gain is frequency dependent or has a non-flat frequency response.

A18. A method of controlling a vibrational transducer, the method comprising:

- tracking a temperature metric of the vibrational transducer; and
- controlling a drive signal for the vibrational transducer, where the drive signal is limited to a value that reduces, or protects against, or reduces a probability of, mechanical clipping of the vibrational transducer, where the value is a function of the tracked temperature metric.

A19. A method of controlling a vibrational transducer, the method comprising:

tracking a temperature metric of the vibrational transducer;

deriving a transducer excursion limit based on the tracked temperature metric; and (dynamically) adjusting a drive signal for the vibrational transducer based on the derived excursion limit, to prevent, or protect against, or reduce a probability of, clipping of the vibrational transducer.

A20. A method of controlling a vibrational transducer, the method comprising:

tracking a temperature metric of the vibrational transducer; and adapting a feedforward excursion prediction model for the vibrational transducer based on the tracked temperature metric; and controlling the vibrational transducer based on the adapted feedforward excursion prediction model.

A21. A method of controlling a vibrational transducer, the method comprising:

tracking a dynamic metric indicative of at least one dynamic characteristic of the vibrational transducer; and limiting a drive signal for driving the vibrational transducer to a value to protect the vibrational transducer from over excursion, wherein said value is a function of the tracked dynamic metric.

A22. A method of controlling a vibrational transducer, the method comprising:

tracking a temperature metric indicative of a temperature of the vibrational transducer; and limiting a drive signal for driving the vibrational transducer to a value to protect the vibrational transducer from over excursion, wherein said value is a function of the tracked temperature metric.

A23. A method of controlling a vibrational transducer, the method comprising:

tracking a temperature of the vibrational transducer; and limiting a drive signal for driving the vibrational transducer to a value to protect the vibrational transducer from over excursion, wherein said value is a function of the tracked temperature.

A24. A method of controlling a vibrational transducer, the method comprising:

tracking a temperature of the vibrational transducer; and generating a drive signal for driving the vibrational transducer based on an input signal according to a defined relationship, said relationship configured to protect the vibrational transducer from over excursion, wherein said relationship is a function of the tracked temperature.

A25. The method according to any of the preceding statements, wherein the vibrational transducer is at least one of:

a haptics transducer;

a resonant actuator such as a linear resonant actuator; and a motor or vibration motor, such as an eccentric rotating mass vibration motor.

A26. A computer program which, when executed on a controller connected for controlling a vibrational transducer, causes the controller to carry out the method of any of the preceding statements.

A27. A computer-readable storage medium having the computer program of statement A26 stored thereon.

A28. A controller for controlling a vibrational transducer, the controller configured to carry out the method of any of statements A1 to A25, optionally wherein the controller is implemented as an integrated circuit (IC), optionally comprising a processor.

A29. A vibrational-transducer system, comprising:

the controller according to statement A28; and the vibrational transducer, wherein the controller is connected to drive the vibrational transducer with the drive signal.

A30. A host device, being an electrical or electronic device, comprising the controller according to statement A28 or the vibrational-transducer system according to statement A29, optionally wherein the host device comprises a cellphone, laptop, tablet computer or other personal device.

B1. There is provided a control system and method for a vibrational transducer, comprising the steps of:

a) Tracking a temperature metric of a vibrational transducer;

b) Controlling a drive signal for the vibrational transducer, where the drive signal is limited to a value that reduces mechanical clipping of the transducer, where the value is a function of the tracked temperature metric.

B2. The step of controlling the drive signal may comprise retrieving a voltage or current limit value from a memory based on the tracked temperature metric. Additionally or alternatively, the step of controlling the drive signal may comprise adapting a control model or a predictive model based on the tracked temperature metric.

B3. There is further provided a control system and method for a vibrational transducer, comprising the steps of:

Tracking a temperature metric of a vibrational transducer;

Deriving a transducer excursion limit based on the temperature metric;

Adjusting a drive signal for the vibrational transducer based on the derived excursion limit, to prevent clipping of the vibrational transducer.

B4. Preferably, the step of deriving a transducer excursion limit comprises determining whether an estimation of transducer excursion is close to a clipping condition based on the temperature metric, and wherein an excursion limit for the drive signal is limited based on the estimation.

B5. Preferably, the excursion limit is derived from an excursion model adapted using the temperature metric.

B6. Preferably, the step of deriving a transducer excursion limit comprises adapting an excursion prediction model based on the temperature metric, and wherein the step of adjusting a drive signal is based on the output of the excursion prediction model.

B7. Preferably, the system and method comprises providing a plurality of excursion limit values for a range of tracked temperature metrics, and wherein the excursion limit is selected from the plurality of excursion limit values based on the tracked temperature metric. The values may be provided in memory, e.g., as a look-up-table (LUT), wherein the plurality of excursion limit values are derived from a characterization of the vibrational transducer and/or a host device incorporating the vibrational transducer.

B8. There is further provided a control system and method for a vibrational transducer, comprising the steps of:

Tracking a temperature metric of a vibrational transducer;

Adapting a feedforward excursion prediction model for the transducer based on the tracked temperature metric; and Controlling the transducer based on the adapted excursion prediction model.

B9. Preferably, the system and method comprises the further steps of:

Tracking an excursion difference metric of the transducer, and

Adapting the feedforward excursion prediction model for the transducer based on the tracked excursion difference metric.

B10. Preferably, the excursion difference metric is calculated based on the excursion prediction model and a direct displacement measurement.

B11. Preferably, the step of adapting the excursion prediction model comprises:

Selecting one of a plurality of predefined excursion prediction models, or

Dynamically adjusting one or more parameters of an existing excursion prediction model.

B12. Preferably, an excursion difference model used to generate the excursion difference metric is adapted based on the tracked temperature metric.

B13. Preferably, there is provided an integrated circuit (IC) comprising a processor arranged to implement the above-described system and method. The IC may comprise an integrated transducer driver for coupling with a haptic vibrational transducer, the transducer driver arranged to output the drive signal. The IC may further comprise an integrated analog front end for interfacing with a force sensor.

B14. Preferably, there is provided a host device in the form of an electronics device, such as a cellphone, laptop, tablet computer or other personal device, comprising the above-described IC or system and method. There is further provided a controller arranged to implement the above-described system and method. It will be understood that the vibrational transducer preferably comprises a linear resonant actuator (LRA) but any other vibrational transducer may be controlled by the described system and method.

The invention claimed is:

1. A method of controlling a vibrational transducer, the method comprising:

tracking a temperature metric of the vibrational transducer; and controlling a drive signal for the vibrational transducer, where the drive signal is limited to a value to protect the vibrational transducer from over excursion, and where said value is a function of the tracked temperature metric;

wherein the method comprises:

generating the drive signal based on an input signal; and generating said temperature metric based on an excursion difference, being a difference between a predicted excursion, predicted by an excursion prediction model based on the input signal or the drive signal, and a direct displacement value, generated based upon a current drawn by the vibrational transducer and/or a voltage across the vibrational transducer.

2. The method according to claim 1, comprising adjusting said value based on the temperature metric to reduce, or at least partly compensate for an effect of, the temperature of the vibrational transducer on:

the over-excursion protection; and/or mechanical clipping of the vibrational transducer; and/or a probability or risk of mechanical clipping of the vibrational transducer; and/or a rate of incidence of mechanical clipping of the vibrational transducer.

3. The method according to claim 1, wherein:

said temperature metric is indicative of a temperature of the vibrational transducer; and/or said temperature metric is a measure of the temperature of the overall vibrational transducer; and/or the vibrational transducer comprises a plurality of sub-components including a coil, and said temperature metric is a measure of the temperature, or a representative temperature, of a combination of the plurality of sub-components.

4. The method according to claim 3, wherein the plurality of sub-components comprises the coil, an enclosure, a moveable mass, and a spring.

5. The method according to claim 1, comprising generating said temperature metric based on one or more signals and/or electrical properties of the vibrational transducer.

6. The method according to claim 1, comprising generating said temperature metric by at least one of:

obtaining a reading from a thermal sensor of, or proximal to, the vibrational transducer;

measuring an impedance of a coil of the vibrational transducer, and estimating a temperature of the coil based on the measured impedance;

using a thermal model to track a temperature change of the coil based on input power to the vibrational transducer; and using a thermal model to track a temperature change of the overall vibrational transducer based on the input power to the vibrational transducer.

7. The method according to claim 1, comprising:

limiting a voltage or current of the drive signal to protect the vibrational transducer from over excursion;

retrieving a voltage limit value or a current limit value from a memory based on the tracked temperature metric; and/or controlling the drive signal by adapting a control model or a predictive model based on the tracked temperature metric; and/or estimating whether excursion of the vibrational transducer is close to over excursion and/or a clipping condition based on the temperature metric, and setting said value based on the estimation, optionally wherein the value is derived from an excursion model adapted using the temperature metric; and/or defining or storing, optionally in a look-up table, a set of said values, being limit values, corresponding respectively to different values or ranges of values of the temperature metric, and selecting a limit value based on the correspondence between said limit values and values of the temperature metric.

8. The method according to claim 1, comprising:

using an excursion prediction model to predict an excursion of the vibrational transducer based on the input signal;

generating the drive signal based on the predicted excursion, or on the input signal and the predicted excursion; and adjusting the excursion prediction model based on the temperature metric to adjust said value.

9. The method according to claim 8, wherein the adjusting the excursion prediction model comprises at least one of:

adjusting one or more parameters of the excursion prediction model; and selecting the excursion prediction model from a plurality of candidate excursion prediction models.

10. The method according to claim 1, comprising:

using a direct displacement model to generate a direct displacement value, being a measure of the excursion of the vibrational transducer, based upon a current drawn by the vibrational transducer and/or a voltage across the vibrational transducer;

generating the drive signal based on the direct displacement value, or on the input signal and the direct displacement value; and adjusting the direct displacement model based on the temperature metric to adjust said value.

11. The method according to claim 10, wherein the adjusting the direct displacement model comprises at least one of:

adjusting one or more parameters of the direct displacement model; and selecting the direct displacement model from a plurality of candidate direct displacement models.

12. The method according to claim 1, comprising:

calculating an excursion difference, being a difference between a predicted excursion, predicted by an excursion prediction model based on the input signal, and a direct displacement value, being a measure of the excursion of the vibrational transducer, generated by a direct displacement model based upon a current drawn by the vibrational transducer and/or a voltage across the vibrational transducer;

generating the drive signal based on the excursion difference, or on the input signal and the excursion difference; and adjusting the excursion prediction model and/or the direct displacement model based on the temperature metric to adjust said value.

13. The method according to claim 12, wherein the adjusting the excursion prediction model and/or the direct displacement model comprises at least one of:

adjusting one or more parameters of the excursion prediction model and/or the direct displacement model; and selecting the excursion prediction model and/or the direct displacement model from a plurality of candidate models.

14. The method according to claim 1, comprising controlling a relationship between the drive signal and the input signal based on the temperature metric to adjust said value.

15. A controller for controlling a vibrational transducer, the controller configured to carry out the method of claim 1.

16. A host device, being an electrical or electronic device, comprising the controller according to claim 15.

* * * * *